(12) United States Patent
Kurtz

(10) Patent No.: US 7,155,980 B2
(45) Date of Patent: Jan. 2, 2007

(54) RESONATING TRANSDUCER

(75) Inventor: Anthony D. Kurtz, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 12 days.

(21) Appl. No.: 11/030,858

(22) Filed: Jan. 7, 2005

(65) Prior Publication Data

US 2006/0150740 A1     Jul. 13, 2006

(51) Int. Cl.
*G01L 11/00* (2006.01)
(52) U.S. Cl. ....................................................... 73/702
(58) Field of Classification Search ................ 73/718, 73/724, 719, 754, 704, 702
See application file for complete search history.

(56) References Cited

U.S. PATENT DOCUMENTS 5,450,754 A * 9/1995 Biebl et al. .................... 73/718
5,473,944 A * 12/1995 Kurtz et al. ................... 73/704
6,813,956 B1 * 11/2004 Kurtz et al. ................... 73/754

* cited by examiner

*Primary Examiner*—Jewel Thompson
(74) *Attorney, Agent, or Firm*—Plevy, Howard & Darcy, PC

(57) ABSTRACT

A resonating pressure transducer operable to measure an applied pressure by measuring changes in a resonant frequency is disclosed. The pressure transducer comprises a plurality of diaphragms formed in a wafer of semi-conducting material between two layers, wherein each of the diaphragms is divided into a plurality of electrically isolated sections; a cavity in one of the covering layers opposite a corresponding one of the diaphragms, a first via formed through a selected one of the layers enables application of a potential to selected ones of the diaphragm sections; and a second via formed through a selected one of the layers enables transmission of a measure from selected ones of the diaphragm sections.

19 Claims, 5 Drawing Sheets

RESONATING TRANSDUCER

FIELD OF THE INVENTION

This application generally relates to the field of transducers, and more specifically to pressure transducers for measuring pressure induced changes in resonant frequency oscillations to determine the applied pressure.

BACKGROUND OF THE INVENTION

A great variety of transducers exist in the art that are used to measure force and pressure in different environments. Many of these sensors use piezoresistive, piezoelectric, and capacitive methods for measuring force and pressure. All these transducers produce relatively low level analog signals wherein both the zero pressure reading and the scale factor can vary as a function of temperature to one degree or another. Moreover, to obtain a digital signal from such a device requires a conversion of the analog to a varying frequency. The consequences of this conversion are less precise force or pressure transducers.

On the other hand, transducers that rely on vibrating structures for the measurement of physical properties such as pressure and force have a number of advantages over conventional analog transducer structures. Vibrating beam transducers are well known in the art. For example, commonly-assigned U.S. Pat. No. 5,473,944, entitled "Beam Pressure Sensor Employing Dielectrically Isolated Resonant Beams and Related Method of Manufacture" issued Dec. 12, 1995 to Kurtz, et al., and U.S. Pat. No. 5,543,349, entitled "Method for Fabricating a Beam Pressure Sensor Employing Dielectrically Isolated Resonant Beams" issued Aug. 6, 1996 to Kurtz, et al., disclose pressure transducers that measure the change in vibration of resonating beams to determine an applied pressure.

In the conventional vibrating beam transducers disclosed in the above referred to patents, as a force is applied to a diaphragm, the diaphragm deflects in response to the applied force and presses on, contacts or otherwise causes a pressure to be imposed on a vibrating beam. The beam is typically vibrating at a resonant frequency, which is altered in response to the deflecting diaphragm. The change in frequency of the vibrating beam is representative of the force applied. In the case of a dual resonating beam transducer, the change in frequency of one beam with respect to a second beam is used to generate a beat frequency that may be used to precisely measure the applied force. For example, if one can resolve the frequency to one part in 105 and each natural frequency is on the order of 100 kHz and the difference in frequency is 10 kHz, an enhancement in the precision of the measurement by a factor of 10 will be achieved.

However, in these conventional transducers it is difficult to measure a precise variation of the resonant frequency as the change in beam resonant frequency depends on the ability to transmit the force from the diaphragm to the vibrating beam. Hence, while a precise measurement may be obtained by the change in resonant frequency, it may not be an accurate measurement.

Accordingly, there is a need in the industry for a resonant or vibrating transducer that provides a more accurate measure of the applied force.

SUMMARY OF THE INVENTION

A resonating pressure transducer operable to measure an applied pressure by measuring changes in a resonant frequency is disclosed. The pressure transducer comprises a plurality of diaphragms formed in a wafer of semi-conducting material between two layers, wherein each of the diaphragms is divided into a plurality of electrically isolated sections; a cavity in one of the covering layers opposite a corresponding one of the diaphragms, a first via formed through a selected one of the layers for applying a potential to selected ones of the diaphragm sections; and a second via formed through a selected one of the layers for transmitting a measure from selected ones of the diaphragm sections.

According to an aspect of the invention, a resonating pressure transducer comprises a layer of semiconducting material having formed therein a pair of diaphragms, each diaphragm capable of deflecting when subjected to a force, and each diaphragm divided into a plurality of electrically isolated conductive sections. A first covering layer is disposed on a first surface of the layer of semiconducting material for covering a surface of the diaphragms; and a second covering layer is disposed on a second surface of said layer of semiconducting material opposite the first surface for covering another surface of the diaphragms. Vias formed through one of the first and second covering layers and in electrical communication with portions of the electrically isolated conductive sections of the diaphragms are operable for communicating an applied potential to cause the diaphragms to vibrate at a given resonant frequency. Recesses are formed in one of the first and second covering layers, said recesses aligned with corresponding ones of the diaphragms for accommodating expansion of the diaphragms when pressure is applied to said transducer. An opening is formed in the other of the first and second covering layers and aligned with one of said diaphragms for exposing a surface of the aligned diaphragm to the applied pressure. Impedance elements are formed in a bridge configuration and associated with respective ones of the pair of diaphragms, for measuring changes in resonant frequency of the corresponding diaphragms resulting from applied pressure to the transducer and operable to provide an output signal indicative of the applied pressure according to the measured difference in frequency of the diaphragms.

According to another aspect of the invention, a sensor system includes a resonating pressure transducer comprising: a layer of semiconducting material having formed therein a pair of diaphragms, each diaphragm divided into a plurality of electrically isolated conductive sections; a first covering layer disposed on a first surface of the layer of semiconducting material; a second covering layer disposed on a second surface of the layer of semiconducting material opposite the first surface; vias formed through one of the first and second covering layers and in electrical communication with portions of the electrically isolated conductive sections of the diaphragms for communicating an applied potential to cause the diaphragms to vibrate at a given resonant frequency; recesses formed in one of the first and second covering layers, the recesses aligned with corresponding ones of the diaphragms for accommodating expansion of the diaphragms when pressure is applied to the transducer; an opening formed in the other of the first and second covering layers and aligned with one of the diaphragms for exposing a first surface of the aligned diaphragm to the applied pressure; and a bridge configuration associated with respective ones of the pair of diaphragms, for measuring changes in resonant frequency of the corresponding diaphragms resulting from applied pressure to said transducer and operable to provide an output signal indicative of the applied pressure according to the measured difference in frequency of the diaphragms. The system further includes a circuit for applying an electrostatic force to cause the transducer diaphragms to vibrate at resonant frequencies; and a monitoring circuit for monitoring the output of the bridge configuration to determine an applied pressure based on a frequency difference associated with the diaphragm vibration frequencies.

BRIEF DESCRIPTION OF THE DRAWINGS

FIG. 3b illustrates schematically the electrical configuration shown in FIG. 3a.

Figure 1:
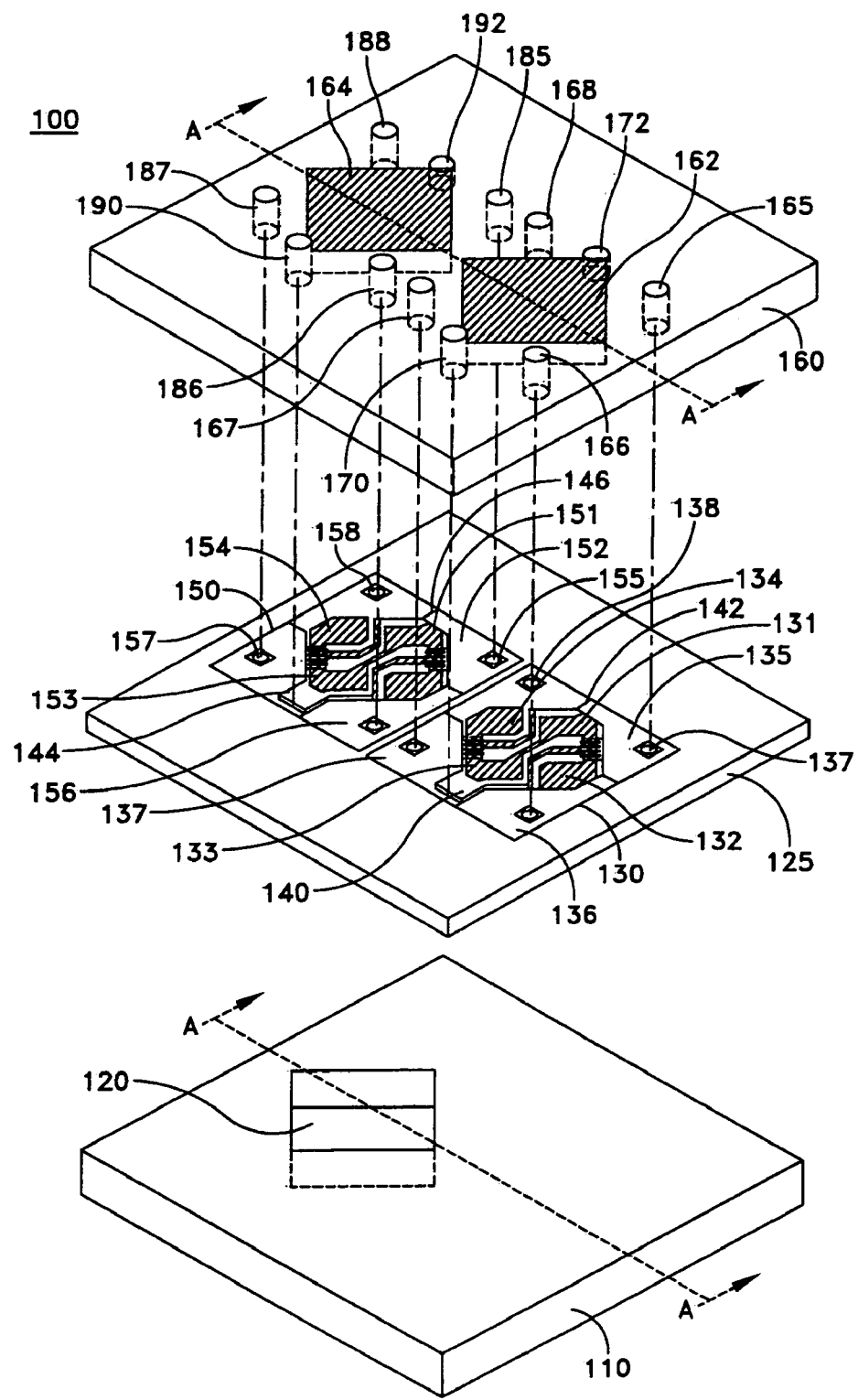
FIG. 1 illustrates a perspective view of a resonating transducer in accordance with the principles of the present invention.

It is to be understood that these drawings are solely for purposes of illustrating the concepts of the invention and are not intended as a definition of the limits of the invention. The embodiments shown in FIGS. 1 through 4 and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE INVENTION

The present invention relates to a pressure transducer employing at least a pair of resonating pressure diaphragms that are constructed such that they are dielectric ally isolated and constrained on four sides. Additionally, the respective sensor networks are also dielectrically isolated from their respective diaphragms. In one aspect each of the diaphragms is constructed to have the same un-strained resonant frequency, which under the application of pressure can be made to change differently, thus enabling a frequency difference to be obtained. For example, in one embodiment of the present invention, one such diaphragm can be exposed to an applied pressure while the other diaphragm can be exposed to an ambient pressure. Since the back of each diaphragm can be referenced to a vacuum, each diaphragm will react only to an absolute pressure. Thus, by obtaining the difference of the two diaphragm frequencies, a gage pressure may be measured accurately. Operation of the diaphragm in vacuum will ensure a minimal mechanical loss and thereby provide a high Q or resonance for the structure. In another embodiment of the present invention, the transducer is constructed so that one of the two diaphragms may be stressed with the application of pressure while the other diaphragm is not. In this way, the difference between the frequencies of the two diaphragms will be a measure of an absolute pressure.

FIG. 1 illustrates a perspective view of one embodiment of the present invention for absolute pressure measurement. In this embodiment a first material layer 110 includes a substantially rectangular opening 120. Although opening 120 is shown as substantially rectangular, it would be recognized that opening 120 may also be other geometric shapes, such as square or circular, for example. In one embodiment, opening 120 is rectangular having a length to width ratio of greater than about 2.5 to 1.

Second layer 125, deposited on first layer 110, contains a plurality of diaphragms 130 and 150, wherein diaphragm 150 is positioned substantially over opening 120. Second layer 125 is preferably made from a silicon or a silicon carbon material. The diaphragms may be constructed as bossed diaphragms, with the boss being rectangular in geometry and having a length to width ratio of greater than about 2.5 to 1. For the case of silicon based diaphragms, the method of fabrication follows the teachings of prior art semiconductor fabrication techniques, such as U.S. Pat. No. 5,543,349.

Diaphragm 130 is also divided into electrically isolated conductive sections 131–134, which as will be discussed with regard to FIG. 3a, includes impedance elements (not shown) such as resistors, for example, that may be used to provide a measure of the pressure applied to diaphragms 130, 150. Associated with each of electrical areas 131–134 are corresponding electrically conductive elements 135–138, which, in accordance with FIG. 2, may be used to provide a means for measuring the changes experienced in resistor values as pressure is applied to the diaphragms. Sections 140 and 142 may be used to provide an electrical input to diaphragm 130 that will cause diaphragm 130 to vibrate or resonate at a known frequency. Diaphragm 150 analogously includes electrical isolated areas 151–154, associated elements 155–158 and areas 144 and 146 corresponding to those described above with regard to diaphragm 130. Diaphragms 130, 150 may be identically fabricated and sized according to known fabrication methods to provide substantially same un-strained resonant frequency response.

Deposited on second layer 125 is covering layer 160. Layer 160 includes substantially rectangular areas 162, 164, which directly oppose diaphragms 130, 150, respectively. Areas 162, 164 each further define a recess formed on a bottom surface of layer 160 adjacent the top surface of semiconductor material layer 125. In one configuration, the recess is formed as a concave surface (see FIG. 2) opposite to an associated diaphragm and sized to allow for expansion of diaphragms 130, 150 when pressure is applied. Although two rectangular areas are depicted, it would be recognized by those skilled in the art that a single area encompassing both diaphragms 130 and 150 is contemplated and considered within the scope of the invention.

Layer 160 further includes vias, i.e., electrical conduits that provide an electrical connection between electrical areas 135–138 and 155–158 on second layer 125 and external connections (not shown). More specifically, with regard to diaphragm 130, vias 165–168 are operable to provide an electrical connection between conductive elements or areas 135–138, respectively, and external connections (not shown). Similarly, vias 185–188 are operable to provide an electrical connection between conductive elements or areas 155–158, respectively, and external connections (not shown). In addition, vias 170 and 172 are operable to provide electrical connection with sections 140, 142, respectively to enable application of an electrostatic force, i.e., voltage or potential, to diaphragm 130 which causes diaphragm 130 to resonate at a known frequency. Similarly, through vias 190 and 192 an electrostatic force may be applied to diaphragm 150 that causes diaphragm 150 to resonate at a second known frequency. Conventional excitation circuitry is applied to excite the diaphragms to vibrate at their resonant frequencies. As one skilled in the art would recognize, each diaphragm may operate at the same or a different frequencies. In the former case, the beat frequency between the two resonant frequencies is substantially zero and this may be used as a "null" reference value. However, in the latter case, a known beat frequency between the two resonant frequencies exists and this beat frequency may be used as a "null" reference value. Suitable electronic processing circuitry may be used to determine and process the differential frequencies in order to determine the effect of pressure on the natural frequency of the transducer diaphragms.

Figure 2:
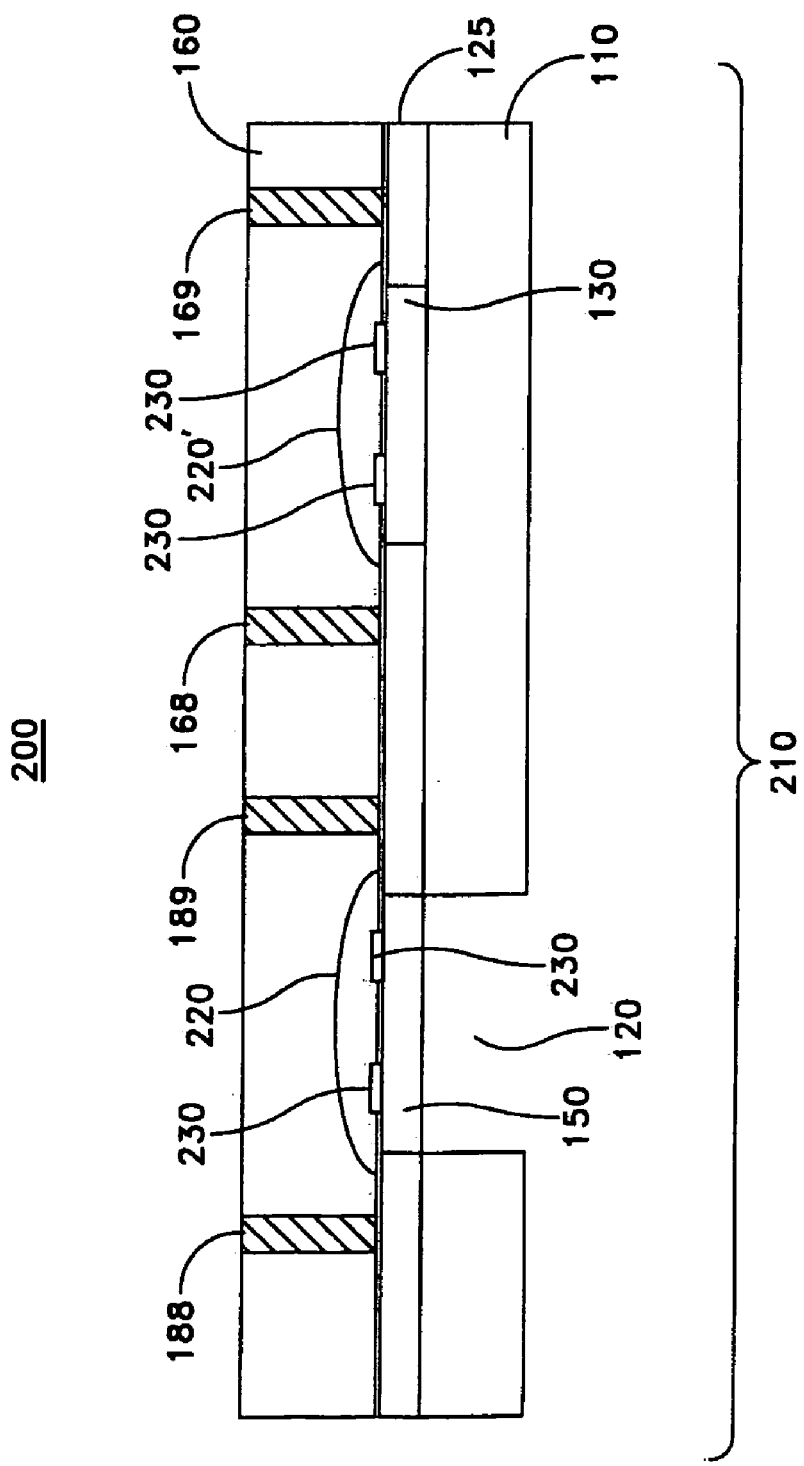
FIG. 2 illustrates a cross-sectional view, through section A—A, of the transducer shown in FIG. 1.

FIG. 2 illustrates a cross section view, through section A—A, of the pressure transducer shown in FIG. 1. As shown, first layer 110 includes opening 120, which, in this exemplary embodiment, exposes diaphragm 150 to an external pressure, which is represented by arrow 210. Diaphragms 130 and 150, in second layer 125 are referenced to a vacuum in concave areas 220, 220' respectively, in third layer 160. Included on diaphragms 130 and 150 are resistive elements 230, that are used to measure changes in resonant frequency of diaphragms 130 and 150.

In this exemplary embodiment, when pressure, P, represented by arrows 210, is applied to transducer 200, and to which diaphragm 150 is exposed, the resonant frequency of diaphragm 150 changes to a frequency which is indicative of the pressure applied. The difference between the changed frequency of diaphragm 150 and the relatively unchanged resonant frequency of diaphragm 130 is taken as a measure of the pressure P 210 applied to diaphragm 150. This measurement is unaffected by changes in the operational temperature of the transducer as both diaphragms 130 and 150 are affected substantially equally by the changes in operational temperature.

Figure 3A:
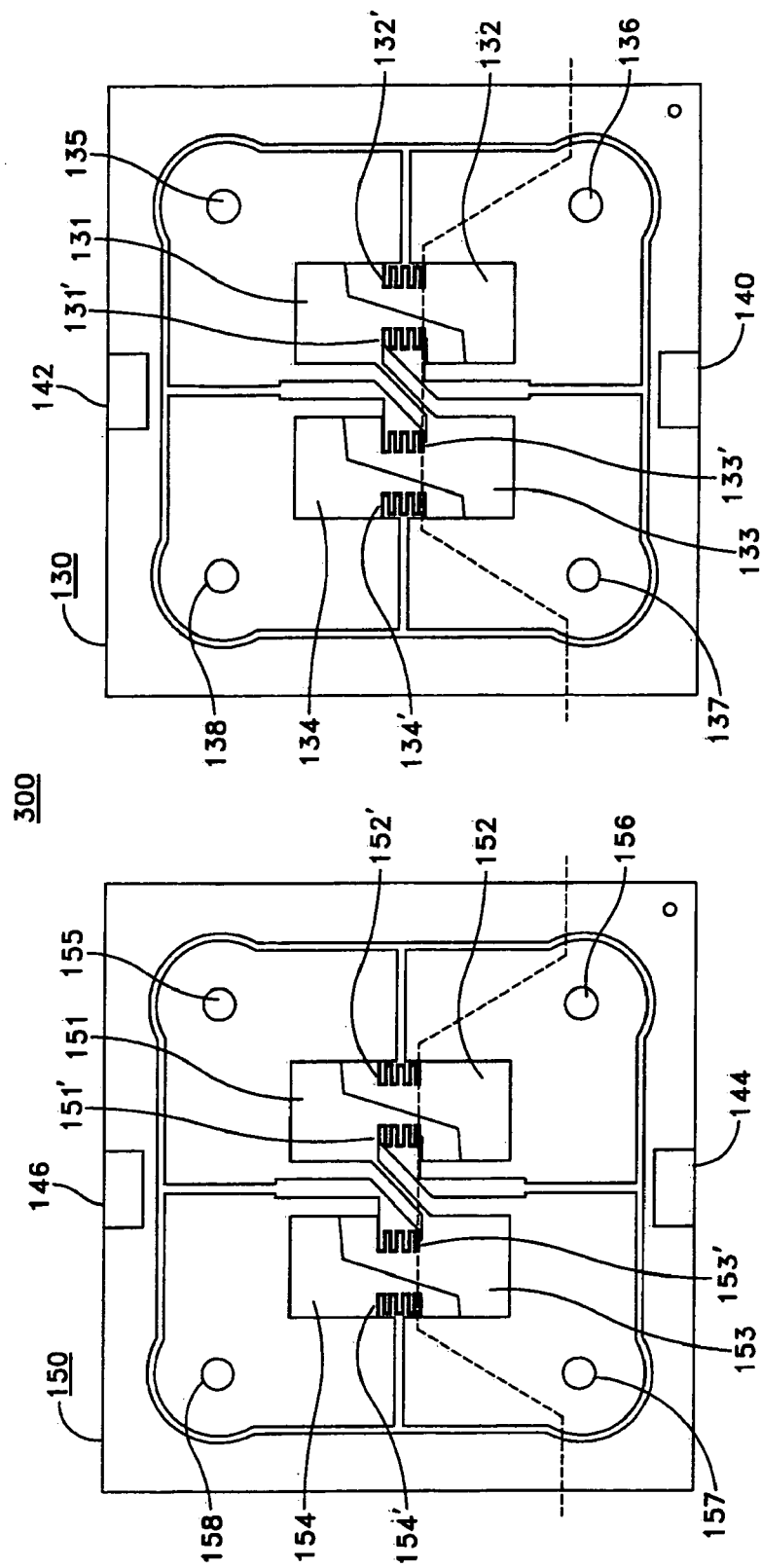
FIG. 3a illustrates a top view of one exemplary embodiment of a pressure transducer in accordance with the principles of the invention.
Figure 3B:
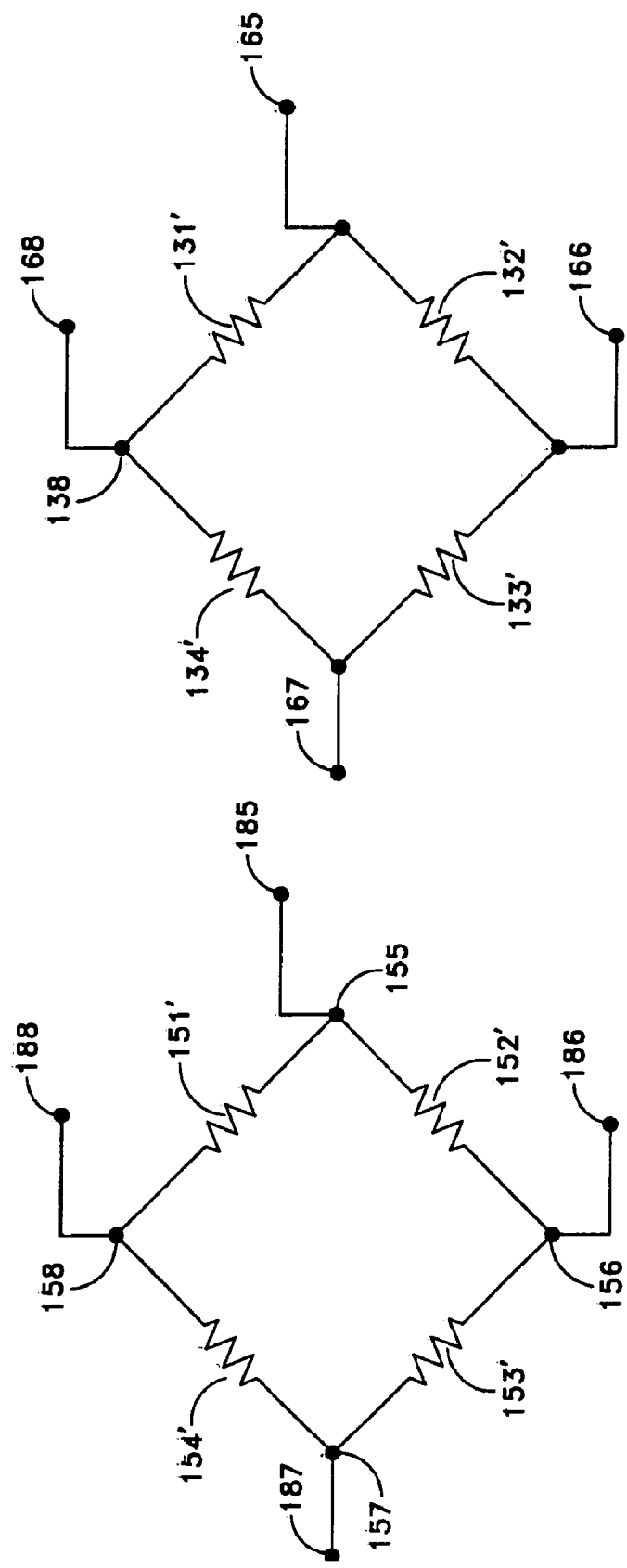

FIG. 3a illustrates a top view of one exemplary embodiment of the present invention, wherein resistive elements 230 are arranged in a Wheatstone Bridge configuration on diaphragms 130 and 150, respectively. More specifically, resistive element 230 associated with the electrically isolated areas 131–134 of diaphragm 130, referred to as 131'–134', are electrically connected such that they form an electrical ring or Wheatstone Bridge. FIG. 3b schematically illustrates the Wheatstone Bridge configuration shown in FIG. 3a for diaphragms 130 and 150. Wheatstone Bridges are well known in the art for the determination of resistive and/or capacitive values or for the measurement of factors that alter resistive and/or capacitive values. In this case, the change in resistive value caused by the change in the frequency of the diaphragm may be used as a measure of the pressure applied to the transducer. Two independent open, full bridges may be formed such that the resulting structure operates as a leadless SOI (silicon-on-insulator) fabricated in accordance with the teachings of prior art semiconductor fabrication techniques, such as U.S. Pat. No. 5,543,349. For the situation where two independent bridges are constructed, a total of eight connections to the two bridges are required. If the structure is manufactured from SiC, an SOI dielectric isolation structure is not necessary as the PN junction isolation for SiC is usable to extremely high temperatures (in excess of 700–800 degrees Celsius, for example).

Figure 4:
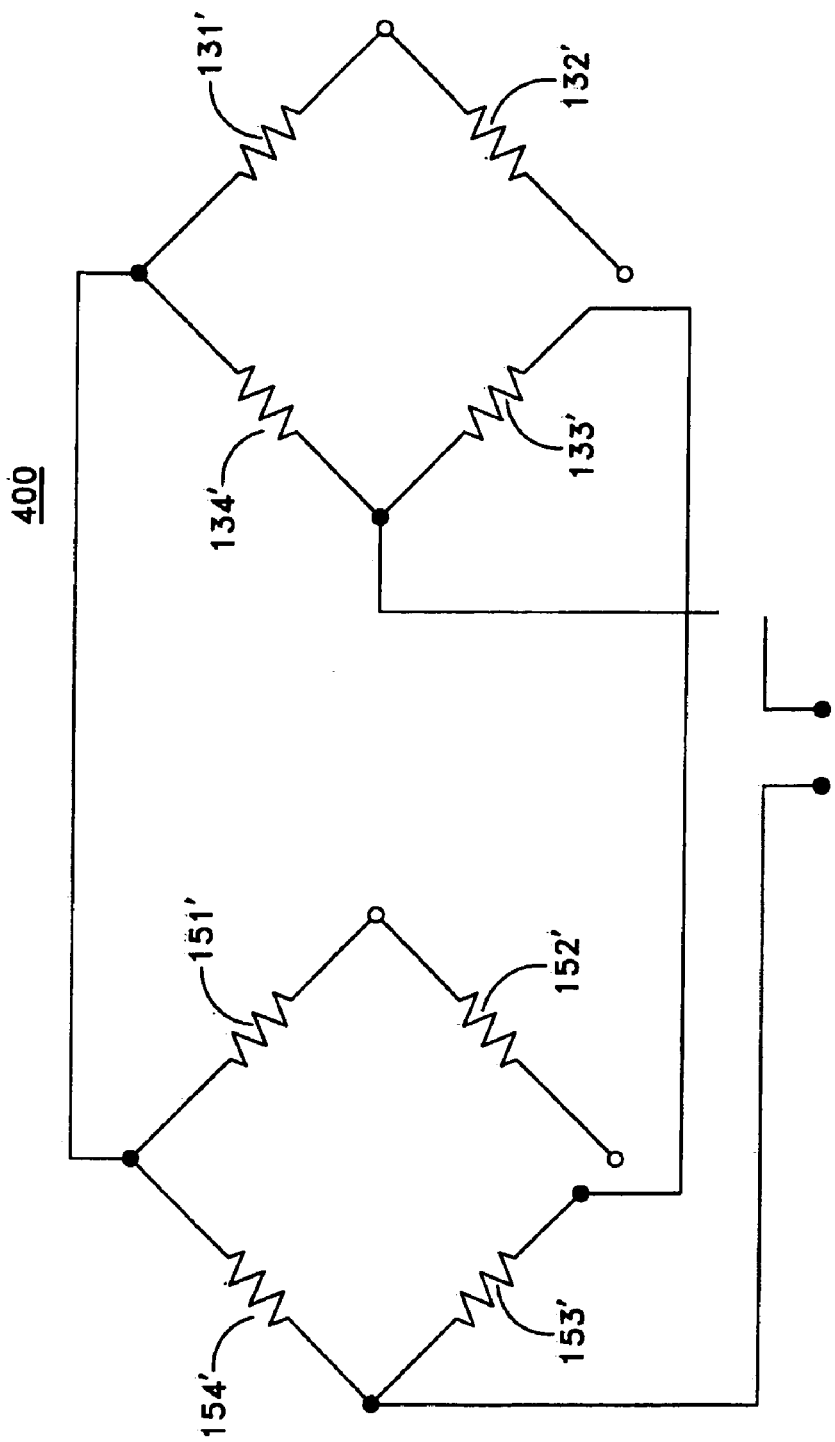
FIG. 4 illustrates schematically a second exemplary electrical configuration for a pressure transducer in accordance with the principles of the invention.

FIG. 4 schematically illustrates another aspect of the invention wherein resistive elements from one diaphragm element are combined with resistive elements of a second diaphragm element to form a Wheatstone Bridge monitoring circuit. Although not shown, one skilled in the art would recognize that a second monitor circuit may be formed using the remaining resistive elements, i.e., 131', 132', 151' and 152'. In one configuration, if the bridge is open then two resistors from the first diaphragm can be combined with fixed external resistors to form one measuring bridge and two resistors from the second diaphragm can be combined with a second set of fixed resistors to form a second measuring bridge. It is understood that by configuring the other two resistors from each diaphragm, a further set of two measuring bridges may also be obtained, using suitable electronic circuitry. If so desired, one set of bridges may be used to determine the static pressure imposed on the transducer while the other set of bridges can be used to determine any time varying pressure.

One of ordinary skill in the art would recognize that the present invention offers many advantages over the prior art. For example, implementation of dual resonating diaphragms as described herein reduces or substantially eliminates the thermal effects between the two diaphragms since each diaphragm changes in substantially the same way as a function of temperature. Moreover, the use of dual diaphragms in the differential condition enables the measurement of gage pressure by subtracting the resonant frequency of the applied gage pressure diaphragm from that of the ambient pressure beam.

The structures disclosed herein are further advantageous in that if it is desired to measure an absolute pressure, i.e., that above vacuum, it is sufficient to ensure that the back side of each resonating diaphragm is exposed to vacuum and only one of the resonating diaphragms is connecting to a compliant diaphragm. In this way the application of an absolute pressure to the front side of the diaphragm will only result in the change of frequency of the stressed diaphragm. Thus, the difference in frequency, i.e., the beat frequency, may be used as a direct measure of an absolute pressure.

In a similar manner, if one wants to measure differential or gage pressure, one needs only to make both diaphragms compliant and expose one diaphragm to atmospheric pressure and the other to the gage pressure to be measured. The difference in resonant frequency between the frequencies of the two diaphragms will provide a response proportional to the gage or differential pressure.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A resonating pressure transducer comprising:
   a plurality of diaphragms formed in a wafer of semiconducting material, contained between two covering layers, wherein each of said diaphragms is divided into a plurality of electrically isolated sections;
   a cavity in one of said covering layers opposite a corresponding one of said diaphragms;
   a first means through a selected one of said covering layers operable to apply a potential to selected ones of said diaphragm sections; and
   a second means through a selected one of said covering layers operable to transmit a measure from selected ones of said diaphragm sections.

2. The transducer as recited in claim 1, further comprising:

resistive elements electrically connected to said second means.

3. The transducer as recited in claim 2, wherein said resistive elements are deposited on select ones of said electrically isolated diaphragm sections.

4. The transducer as recited in claim 3, wherein said resistive elements are piezo-electric resistors.

5. The transducer as recited in claim 2, wherein said resistive elements electrically connect two isolated areas.

6. The transducer as recited in claim 2, wherein said resistive elements are arranged in a Wheatstone Bridge configuration.

7. The transducer as recited in claim 2, wherein selected ones of said resistive elements corresponding to a first one of said diaphragms are electrically connected to selected ones of said resistive elements corresponding to a second one of said diaphragms.

8. The transducer as recited in claim 1, further comprising:
an opening in one of said covering layers opposite at least one of said diaphragms for exposing a surface of said diaphragm to an applied pressure.

9. The transducer as recited in claim 1, wherein said semiconductor material is selected from the group consisting of: silicon and silicon carbon.

10. The transducer as recited in claim 1, wherein each of said diaphragms are substantially identical for generating substantially same un-strained resonant frequencies in response to excitation of said diaphragms.

11. A resonating pressure transducer comprising:
a layer of semiconducting material having formed therein a pair of diaphragms, each said diaphragm capable of deflecting when subjected to a force, each said diaphragm divided into a plurality of electrically isolated conductive sections;
a first covering layer disposed on a first surface of said layer of semiconducting material for covering a surface of said diaphragms;
a second covering layer disposed on a second surface of said layer of semiconducting material opposite said first surface for covering another surface of said diaphragms;
vias formed through one of said first and second covering layers and in electrical communication with portions of said electrically isolated conductive sections of said diaphragms for communicating an applied potential to cause the diaphragms to vibrate at a given resonant frequency;
recesses formed in one of said first and second covering layers, said recesses aligned with corresponding ones of said diaphragms for accommodating expansion of said diaphragms when pressure is applied to said transducer;
an opening formed in the other of said first and second covering layers and aligned with one of said diaphragms for exposing a surface of said aligned diaphragm to said applied pressure; and
impedance elements formed in a bridge configuration and associated with respective ones of said pair of diaphragms, for measuring changes in frequency of the corresponding diaphragms resulting from applied pressure to said transducer and operable to provide an output signal indicative of the applied pressure according to the measured difference in frequency of said diaphragms.

12. A resonating pressure transducer as recited in claim 11, wherein the recesses are formed in the other one of said first and second covering layers not containing said opening, and wherein said recesses are opposite a second surface of said diaphragms defining a vacuum.

13. A resonating pressure transducer as recited in claim 12, wherein said impedance elements comprise resistors for measuring changes in resonant frequency of said diaphragms.

14. A resonating pressure transducer as recited in claim 13, wherein said bridge configuration comprises a Wheatstone Bridge including piezoelectric resistors associated with each diaphragm.

15. A resonating pressure transducer as recited in claim 14, wherein said bridge configuration comprises two independent open, full Wheatstone Bridges.

16. A sensor system comprising:
a resonating pressure transducer comprising: a layer of semiconducting material having formed therein a pair of diaphragms, each said diaphragm divided into a plurality of electrically isolated conductive sections; a first covering layer disposed on a first surface of said layer of semiconducting material; a second covering layer disposed on a second surface of said layer of semiconducting material opposite said first surface; vias formed through one of said first and second covering layers and in electrical communication with portions of said electrically isolated conductive sections of said diaphragms for communicating an applied potential to cause the diaphragms to vibrate at a given resonant frequency; recesses formed in one of said first and second covering layers, said recesses aligned with corresponding ones of said diaphragms for accommodating expansion of said diaphragms when pressure is applied to said transducer; an opening formed in the other of said first and second covering layers and aligned with one of said diaphragms for exposing a first surface of said aligned diaphragm to said applied pressure; and a bridge configuration associated with respective ones of said pair of diaphragms, for measuring changes in resonant frequency of the corresponding diaphragms resulting from applied pressure to said transducer and operable to provide an output signal indicative of the applied pressure according to the measured difference in frequency of said diaphragms;
a circuit for applying an electrostatic force to said cause said transducer diaphragms to vibrate at resonant frequencies; and
a monitoring circuit for monitoring the output of the bridge configuration to determine an applied pressure based on a frequency difference associated with said diaphragm vibration frequencies.

17. The system of claim 16, wherein the semiconducting material of the transducer is selected from the group consisting of: silicon, silicon carbon.

18. The system of claim 16, wherein the bridge configuration comprises a pair of Wheatstone Bridges, each Wheatstone Bridge formed of fixed external resistors in combination with piezoelectric resistors formed on the corresponding diaphragm.

19. The system of claim 16, wherein each said Wheatstone Bridge comprises an open, full Wheatstone Bridge configuration.

* * * * *